(12) United States Patent
Zhang et al.

(10) Patent No.: US 7,805,994 B2
(45) Date of Patent: Oct. 5, 2010

(54) SILICON MICROMECHANICAL GYROSCOPE

(75) Inventors: Fuxue Zhang, Beijing (CN); Wei Zhang, Beijing (CN)

(73) Assignee: Beijing Walkang Science and Technology Limited Company, Chaoyang District, Beijing (CN)

( * ) Notice: Subject to any disclaimer, the term of this patent is extended or adjusted under 35 U.S.C. 154(b) by 104 days.

(21) Appl. No.: 11/906,200

(22) Filed: Sep. 29, 2007

(65) Prior Publication Data

US 2008/0295596 A1    Dec. 4, 2008

(30) Foreign Application Priority Data

Jun. 1, 2007    (CN) .................... 2007 1 0105849 A

(51) Int. Cl.
  G01P 9/04    (2006.01)
  G01C 19/00    (2006.01)

(52) U.S. Cl. ............... 73/504.12; 73/504.04; 73/504.14

(58) Field of Classification Search ............. 73/504.04, 73/504.12, 504.15, 493, 504.14, 504.13, 73/504.02
See application file for complete search history.

(56) References Cited

U.S. PATENT DOCUMENTS

| | | | |
|---|---|---|---|
| 5,329,815 A * | 7/1994 | Dunn et al. ............... | 73/504.12 |
| 5,668,316 A * | 9/1997 | Iwai et al. ................ | 73/493 |
| 5,939,630 A * | 8/1999 | Nozoe et al. .............. | 73/504.16 |
| 6,009,751 A * | 1/2000 | Ljung ..................... | 73/504.02 |
| 6,199,429 B1 * | 3/2001 | Hirosawa ................. | 73/504.15 |
| 6,289,733 B1 * | 9/2001 | Challoner et al. ......... | 73/504.12 |
| 6,467,349 B1 * | 10/2002 | Andersson et al. ....... | 73/504.14 |
| 6,490,923 B1 * | 12/2002 | Breng et al. ............. | 73/504.12 |
| 6,584,845 B1 * | 7/2003 | Gutierrez et al. ......... | 73/514.15 |
| 6,588,275 B2 * | 7/2003 | Kato et al. ............... | 73/504.12 |
| 6,619,121 B1 * | 9/2003 | Stewart et al. ........... | 73/504.02 |
| 6,675,652 B2 * | 1/2004 | Yamazaki ................ | 73/504.16 |
| 6,739,192 B1 * | 5/2004 | Okoshi et al. ............ | 73/504.16 |
| 7,578,186 B2 * | 8/2009 | Matsuhisa ................ | 73/504.12 |
| 7,640,803 B1 * | 1/2010 | Gutierrez et al. ......... | 73/504.04 |
| 2007/0044558 A1 * | 3/2007 | Ohta ........................ | 73/493 |

* cited by examiner

Primary Examiner—Helen C. Kwok

(57) ABSTRACT

The present invention relates to a novel silicon micromechanical gyroscope, which is used in control technology field to measure pose measurement of a rotating body, such as aerobat, motor tire and drilling platform, wherein the novel silicon micromechanical gyroscope main includes a sensing element and a signal process circuit. The sensing element further comprises a silicon slice frame, a silicon slice, an upper electrode ceramics plate and a bottom electrode ceramics plate. The signal process circuit further comprises a signal detecting bridge circuit used as bridge arm of the capacitor sensing element, and a SCM signal process circuit with data process module. The novel silicon micromechanical gyroscope is able to replace a drive force from the drive conformation with a rotating force from the rotation of the rotating body so as to achieve a novel silicon micromechanical gyroscope without a drive conformation. The novel silicon micromechanical gyroscope without a drive conformation to mostly achieve purposes like minify in craft, simply in structure and reduced in volume so as to effectively lower cost and save energy.

7 Claims, 10 Drawing Sheets

SILICON MICROMECHANICAL GYROSCOPE

BACKGROUND OF THE PRESENT INVENTION

1. Field of Invention

The present invention relates to a novel silicon micromechanical gyroscope, which is used in control technology field to measure pose measurement of a rotating body, such as aerobat, motor tire and drilling platform, wherein the novel silicon micromechanical gyroscope main includes a sensing element and a signal process circuit.

2. Description of Related Arts

At present, in control technology field, piezoelectric gyroscope and optical-fibre gyroscope have some disadvantages like, bulked volume and high cost. Micromechanical gyroscope is widespread in the market. However, the micromechanical gyroscope exist in the market is of intermediate grade or low grade precision, and the high grade precision micromechanical gyroscope is still in research. The shortcoming of the micromechanical gyroscope existed in the international market is that the existed micromechanical gyroscope still has a drive conformation, which is complex in structure and craft, high cost and bulk volume.

SUMMARY OF THE PRESENT INVENTION

A main object of the present invention is to provide a novel silicon micromechanical gyroscope without a drive conformation to mostly achieve purposes like minify in craft, simply in structure and reduced in volume so as to effectively lower cost and save energy.

Accordingly, in order to accomplish the above objects, the basic idea of the present invention is provided a novel silicon micromechanical gyroscope, which is able to replace a drive force from the drive conformation with a rotating force from the rotation of the rotating body so as to achieve a novel silicon micromechanical gyroscope without a drive conformation.

FIG. 1 of the drawings illuminates a schematic diagram of the novel silicon micromechanical gyroscope, which comprises a rectangle silicon slice and an elastic twist beam to hang the rectangle silicon slice on a packaging chamber, in which the silicon slice can rotate freely.

A rotating angle $\alpha$ of the silicon slice is detected by a differential capacitor, which has a first pair of polar plates electrical connected to the silicon slice, and a second pair of polar plates electrical connected to the packaging chamber. The silicon slice and the elastic twist beam are made of corroded silicon.

The novel silicon micromechanical gyroscope is provided at the rotating body to rotate along a longitudinal shaft vertically defined to the silicon surface in an angular velocity $\dot{\varphi}$, and rotate along a horizontal shaft of an aerobat in an angular velocity $\Omega$. Silicon manufacture is a mature technology, and the silicon can be manufactured in quantity.

The torsional rigidity factor $K_T$ of the elastic twist beam should be considered in the novel silicon micromechanical gyroscope. As the same time, the output signal of the angular velocity and the rotating angular of the gyroscope (from the rotation of the rotating body) both will influence the measure precision of the novel silicon micromechanical gyroscope. Hence, from a motion equation of the novel silicon micromechanical gyroscope, we can learn that when a coordinate system XYZ is set up, a preliminary result comes out once the torsional rigidity factor $K_T$ input, ignoring other rotating body's angular velocity. The motion equation is $$B\ddot{\alpha}+D\dot{\alpha}+[(C-A)\dot{\varphi}^2+K_T]\alpha=(C+B-A)\dot{\varphi}\sin\dot{\varphi}t \quad (1)$$

In above equation, A, B, C respectively represents a rotating inertia of the gyroscope sensing element according to X-axis, Y-axis and Z-axis, wherein D represents dynamic damp factor.

The stationary state solution of equation (1) is $$\alpha = \frac{(C+B-A)\dot{\varphi}\Omega}{\sqrt{[(C-A-B)\dot{\varphi}^2+K_T]^2+(D\dot{\varphi})^2}}\sin\dot{\varphi}t \quad (2)$$

In an angular velocity measurement, the oscillation amplitude $\alpha_m$ of the gyroscope sensing element is $$\alpha_m = \frac{(C+B-A)\dot{\varphi}}{\sqrt{[(C-A-B)\dot{\varphi}^2+K_T]^2+(D\dot{\varphi})^2}}\Omega \quad (3)$$

In above equation, the torsional rigidity factor $K_T$ is a denominator. Hence, a great instability parameter (such as a rotational angular velocity $\varphi$ of rotating body) will influence the output signal, even under a resonance mode, here, the dynamic viscosity factor is $$\mu = \frac{C}{A+B} = 1$$

Therefore, according to the measure precision come out, we need some else strategies to choice a new gyroscope parameter for the novel silicon micromechanical gyroscope. First, we need pay more attention to the physical characteristics and manufacture technology of the silicon. The relationship between the rotary inertia and the elastic twist factor should meet the fellow equation $$(C-A-B)\dot{\varphi}^2=K_T \quad (4)$$

It is worth to mention that because of the stability of the damp factor D is less than that of the elastic factor $K_T$, the parameter in the equation (3) should be met $$K_T < D\dot{\varphi} \quad (5)$$

What's more, this above parameter relationship hardly achieved because of the damp factor D increases only when the distance between the silicon slice and the electrical polar is reduced so as to reduce the tangent value between the most deviate angular of the silicon slice and the corresponding output curve. Hence, during a parameter initialization, $$K_T > D\dot{\varphi} \quad (6)$$

Therefore, the denominator in equation (3) is decided by the elastic factor of the silicon slice of the gyroscope.

However, the output signal of the novel silicon micromechanical gyroscope and the rotational speed of the rotating body in a direct ratio so that the output signal is instability. In actually practice, for overcoming above drawback, a differential angular velocity measurement is provided to achieve the output signal frequency to count the constant $\dot{\varphi}$. Alternatively, a microprocessor is provided in the gyroscope to count the constant $\dot{\varphi}$. Therefore, the novel silicon micromechanical gyroscope maybe not in a resonance mode, but should be in an advance disresonance mode to avoid other dynamic error.

FIG. 2 is a perspective view of the single crystal silicon slice of the novel silicon micromechanical gyroscope. In FIG.

2, $a_0$, $a_1$, $a_2$, $a_3$ represent dimension in X-axis, b1, b2, b3 represent dimension in Y-axis, and h is the thickness of the single crystal silicon slice. And, A, B, C respectively represents $$A = \frac{\rho}{12}\begin{bmatrix} a_3b_3h(b_3^2+h^2) - a_2b_2h(b_2^2+h^2) - \\ a_1(b_3-b_1)h\begin{bmatrix} \frac{1}{4}(b_3-b_1)^2+h^2+ \\ \frac{3}{4}(b_3+b_1)^2 \end{bmatrix} \end{bmatrix} \quad (7)$$

$$B = \frac{\rho}{12}\begin{bmatrix} a_3b_3h(a_3^2+h^2) - a_2b_2h(a_2^2+h^2) - \\ a_1(b_3-b_1)h(a_1^2+h^2) \end{bmatrix} \quad (8)$$

$$C = \frac{\rho}{12}\begin{bmatrix} a_3b_3h(b_3^2+a_3^2) - a_2b_2h(b_2^2+a_2^2) - \\ a_1(b_3-b_1)h\begin{bmatrix} \frac{1}{4}(b_3-b_1)^2+a_1^2+ \\ \frac{3}{4}(b_3+b_1)^2 \end{bmatrix} \end{bmatrix} \quad (9)$$

In above equation, $\rho$ is the density of the single crystal silicon slice.

Due to $h \ll a_1, a_2, a_3, b_1, b_2, b_3$ and the torsional rigidity factor of the elastic twist beam of the single crystal silicon slice $K_T$ is great, $(C-A-B) \dot{\phi}^2 \ll K_T$.

From the above, we can learn that a well designed structure of the novel silicon micromechanical gyroscope could stabilize the output signal. The amplitude figure of output signal $\alpha$ relates to the rotating angular velocity $\dot{\phi}$ of the rotating body, which could be achieved by measuring the angular vibrate signal frequency. From $\phi$ and $\dot{\phi}$, a pitch or roll angular velocity $\Omega$ can be counted. Additional, if $\dot{\phi}$ is amplified by a amplify circuit, $\Omega$ and $\phi$ would vary in a linearity.

According to above theories, the novel silicon micromechanical gyroscope, can be driven by the measured rotating body' rotary force, instead of driven by force from a drive conformation of the conventional gyroscope. This gyroscope is able to measure the rotating body's rotation angular velocity, pitch angular velocity and roll angular velocity.

FIG. 3 illustrates a signal achieve process of the present invention. When the single crystal silicon slice vibrates in an angular frequency $\dot{\phi}$, the variation of the deviation angular $\alpha$ will lead the change of four condensers C1, C2, C3, C4 made of single crystal silicon slice and ceramics electrical polar board. The condenser vary signal is transferred into a voltage vary signal and then the voltage vary signal is amplified to a AC voltage signal, which relates to $\phi$ and $\Omega$. As the capacity variation of the novel silicon micromechanical gyroscope is little and easily impacted by the distributed capacity, an AC bridge circuit is used as an interface transfer circuit. A capacitance sensing element is used as the working arm of the AC bridge circuit, and a HF square wave is used as the carrier wave. Once the capacity is vary, an adjust output signal is received from the AC bridge circuit. Been amplified and restituted, the LF output signal is output. The signal process circuit mainly comprises a source voltage regulator, a reference voltage source, a square wave signal generating circuit, a bridge circuit, a bridge circuit signal differential amplifier, a band pass wave filter, a LP wave filter, a phase amendment circuit, a polar choice switch and a SCM circuit.

$$C = \int_{r_1}^{r_2} \frac{\varepsilon \Delta b}{d+\alpha r} dr = \frac{\varepsilon \Delta b}{\alpha} \ln\left(1 + \frac{\frac{r_2-r_1}{d}}{1+\frac{r_1}{d}\alpha}\alpha\right) \quad (10)$$

$$C(d,\alpha) = \frac{\varepsilon}{\alpha}\begin{bmatrix} (b_1-b_2)\ln\left(1+\frac{\frac{a_1-a_0}{2d}}{1+\frac{a_0}{2d}\alpha}\alpha\right) + \\ (b_3-b_2)\ln\left(1+\frac{\frac{a_2-a_1}{2d}}{1+\frac{a_1}{2d}\alpha}\alpha\right) + \\ b_3\ln\left(1+\frac{\frac{a_3-a_2}{2d}}{1+\frac{a_2}{2d}\alpha}\alpha\right) \end{bmatrix} \quad (11)$$

If the single crystal silicon slice has no deflection ($\alpha=0$), $C_1=C_2=C_3=C_4=C_0$, $$C_0 = \varepsilon\begin{bmatrix} (b_1-b_2)\left(\frac{a_1-a_0}{2d}\right) + (b_3-b_2)\left(\frac{a_2-a_1}{2d}\right) + \\ b_3\left(\frac{a_3-a_2}{2d}\right) \end{bmatrix} \quad (12)$$

If the single crystal silicon slice has deflection ($\alpha \neq 0$), $$C_1 = C_4 = \frac{\varepsilon}{\alpha}\begin{bmatrix} (b_1-b_2)\ln\left(1+\frac{\frac{a_1-a_0}{2d}}{1+\frac{a_0}{2d}\alpha}\alpha\right) + \\ (b_3-b_2)\ln\left(1+\frac{\frac{a_2-a_1}{2d}}{1+\frac{a_1}{2d}\alpha}\alpha\right) + \\ b_3\ln\left(1+\frac{\frac{a_3-a_2}{2d}}{1+\frac{a_2}{2d}\alpha}\alpha\right) \end{bmatrix} \quad (13)$$

$$C_2 = C_3 = -\frac{\varepsilon}{\alpha}\begin{bmatrix} (b_1-b_2)\ln\left(1-\frac{\frac{a_1-a_0}{2d}}{1-\frac{a_0}{2d}\alpha}\alpha\right) + \\ (b_3-b_2)\ln\left(1-\frac{\frac{a_2-a_1}{2d}}{1-\frac{a_1}{2d}\alpha}\alpha\right) + \\ b_3\ln\left(1-\frac{\frac{a_3-a_2}{2d}}{1-\frac{a_2}{2d}\alpha}\alpha\right) \end{bmatrix} \quad (14)$$

a voltage signal output is achieved:

$$|V_1 - V_2| = \frac{4\varepsilon\omega_e R V_s}{\alpha}\begin{bmatrix} (b_1-b_2)\ln\left(\frac{1+\frac{(a_1-a_0)\alpha}{2d+a_0\alpha}}{1-\frac{(a_1-a_0)\alpha}{2d-a_0\alpha}}\right) + \\ (b_3-b_2)\ln\left(\frac{1+\frac{(a_2-a_1)\alpha}{2d+a_1\alpha}}{1-\frac{(a_2-a_1)\alpha}{2d-a_1\alpha}}\right) + \\ b_3\ln\left(\frac{1+\frac{(a_3-a_2)\alpha}{2d+a_2\alpha}}{1-\frac{(a_3-a_2)\alpha}{2d-a_2\alpha}}\right) \end{bmatrix} \quad (15)$$

In above equations, Vs is the AC voltage loaded on the bridge circuit, ωe is the angular frequency of the AC, and R is the electrical resistance of the bridge circuit.

FIG. 4 shows a signal process circuit diagram of the present invention. The signal process circuit comprises a source voltage regulator, a reference voltage source, a square wave signal generating circuit, a bridge circuit, a differential amplifier circuit, a band pass wave filter, a LP wave filter, a gain-programmed amplifier, a phase amendment circuit, a polar choice switch and a SCM circuit.

The novel silicon micromechanical gyroscope of the present invention is directly mounted on the measured rotating body and driven by the rotary force of the measured rotating body.

The present invention has advantages like, simply in structure and craft, without conventional drive conformation and correspondent circuit, compact in volume, lower in cost and save in energy. Moreover, the present invention is able to measure the spin angular velocity, the roll angular velocity and the pitch angular velocity of the rotating body. In other word, the present invention is able to measure a rotating body's angular velocity.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
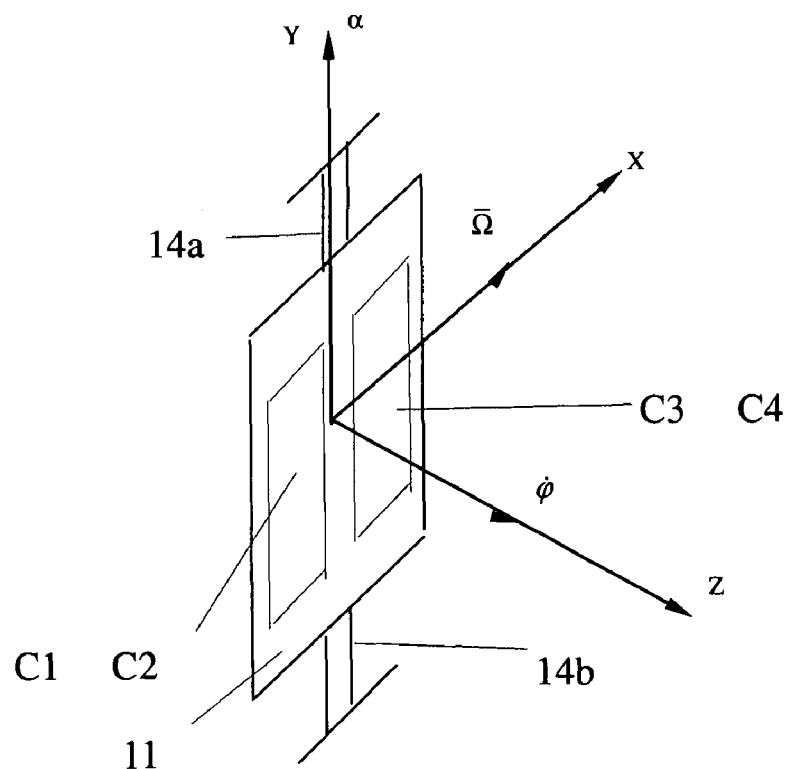
FIG. 1 is a schematic diagram of a novel silicon micromechanical gyroscope according to the preferred embodiment of the present invention, wherein C1, C2, C3, C4 shown in the diagram is differential electric condensers.
Figure 2:
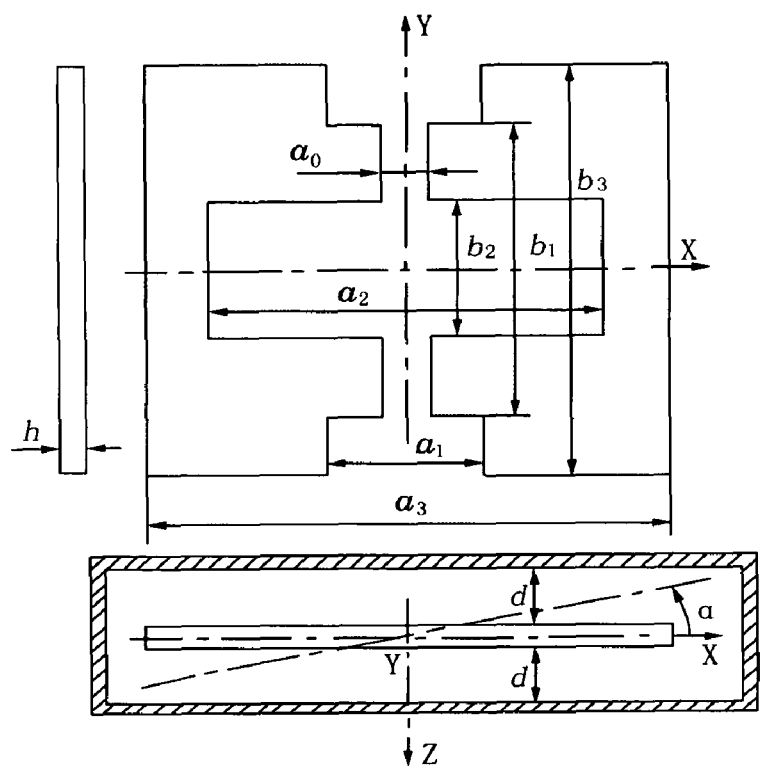
FIG. 2 is a perspective view of the novel silicon micromechanical gyroscope according to the preferred embodiment of the present invention.
Figure 3:
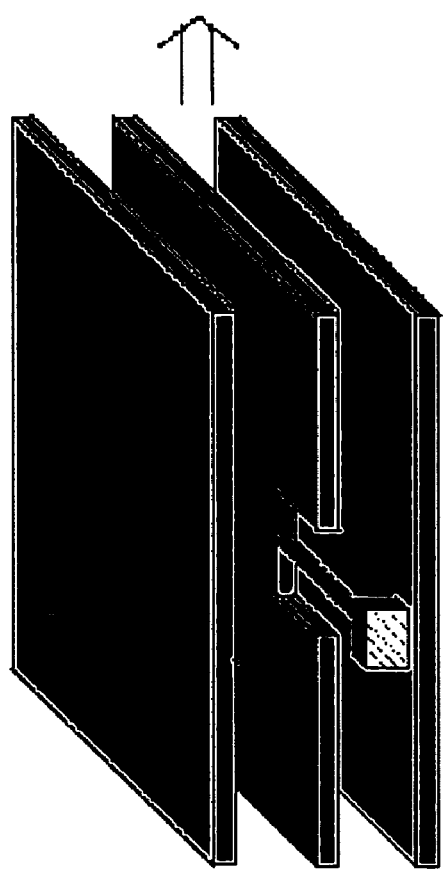
FIG. 3 is a schematic diagram of a signal achieving circuit of the novel silicon micromechanical gyroscope according to above preferred embodiment of the present invention.
Figure 3:
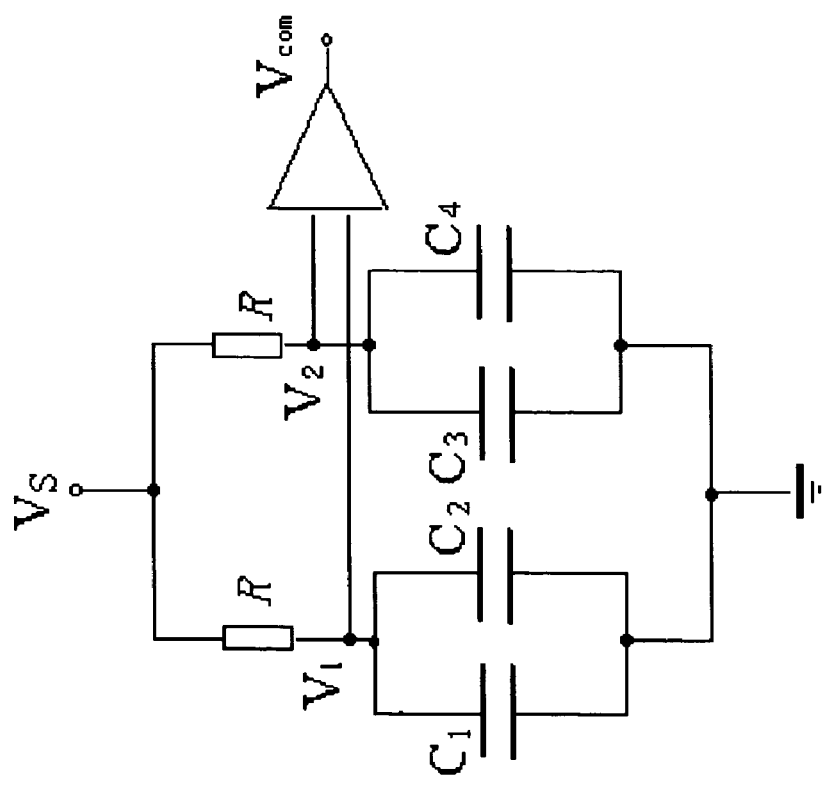
Figure 4:
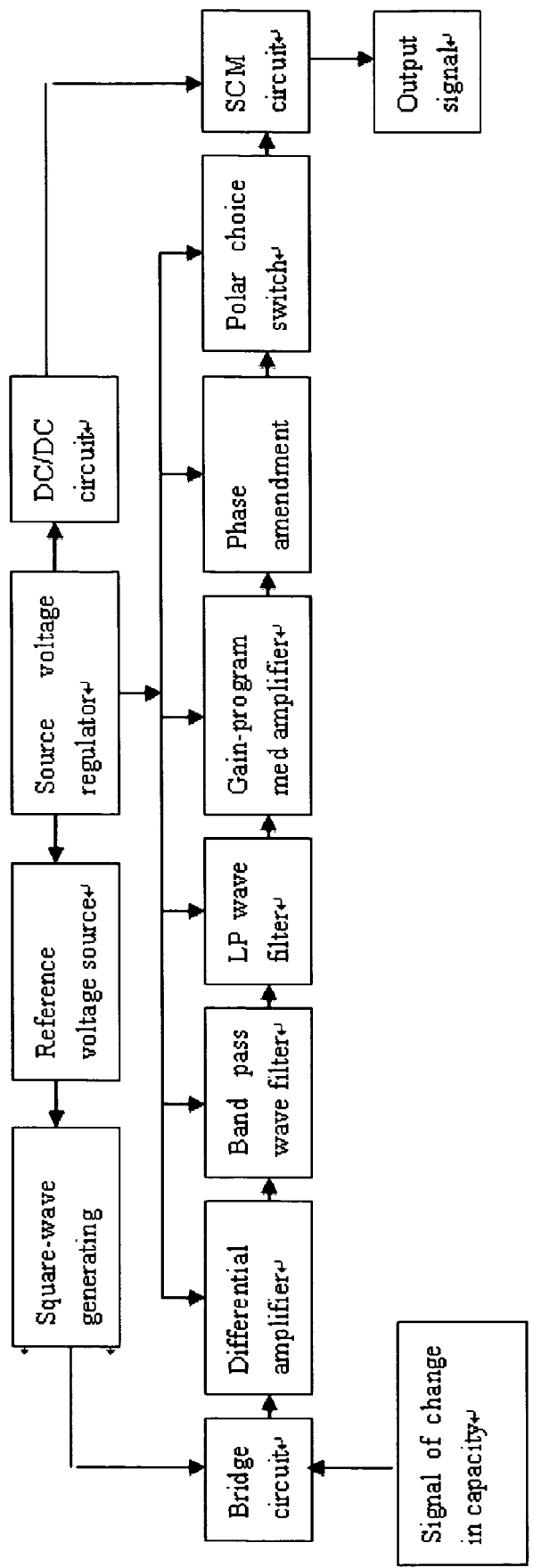
FIG. 4 is a block diagram of a signal process circuit of the novel silicon micromechanical gyroscope according to above preferred embodiment of the present invention.

Referring to FIGS. 5 to 8 of the drawings, a novel silicon micromechanical gyroscope, according to a preferred embodiment of the present invention is illustrated. The novel silicon micromechanical gyroscope comprises a sensing element 1 adapted for measuring a spin angular velocity, a roll angular velocity and a pitch angular velocity of a rotating body, a signal process circuit 2, a housing 3, a base board 4, a mounting frame 5 and a insulator 6. The signal process circuit 2 is provided at the upper section of the base board 4, and the sensing element 1 is provided at the bottom section of the base board 4. The base board 4 is disposed in the housing 3, and the sensing element 1 is enclosed in a sealed chamber constituted of the housing 3 and the base board 4. A first ceramics circular gasket 7 is provided between the base board 4 and a circuit board of the signal process circuit 2, and a second ceramics circular gasket 8 is provided between the base board 4 and the sensing element 1. The insulator 6 is used for electrically connecting the sensing element 1 to the signal process circuit 2 by a spot 9. Otherwise, the insulator 6 also is used for electrically connecting the electric source and the signal process output.

Figure 9:
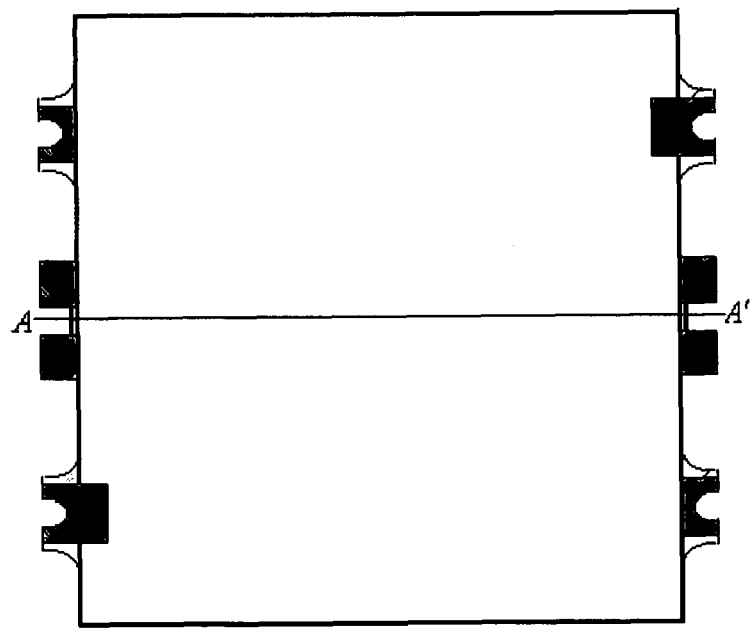
FIG. 9 is a top view of a sensing element of the novel silicon micromechanical gyroscope according to above preferred embodiment of the present invention.
Figure 10:
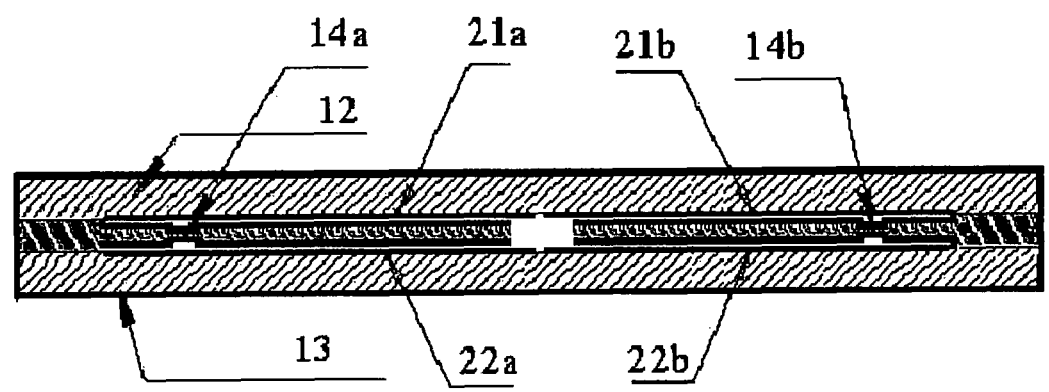
FIG. 10 is a cross section view of the sensing element of the novel silicon micromechanical gyroscope according to above preferred embodiment of the present invention.
Figure 14:
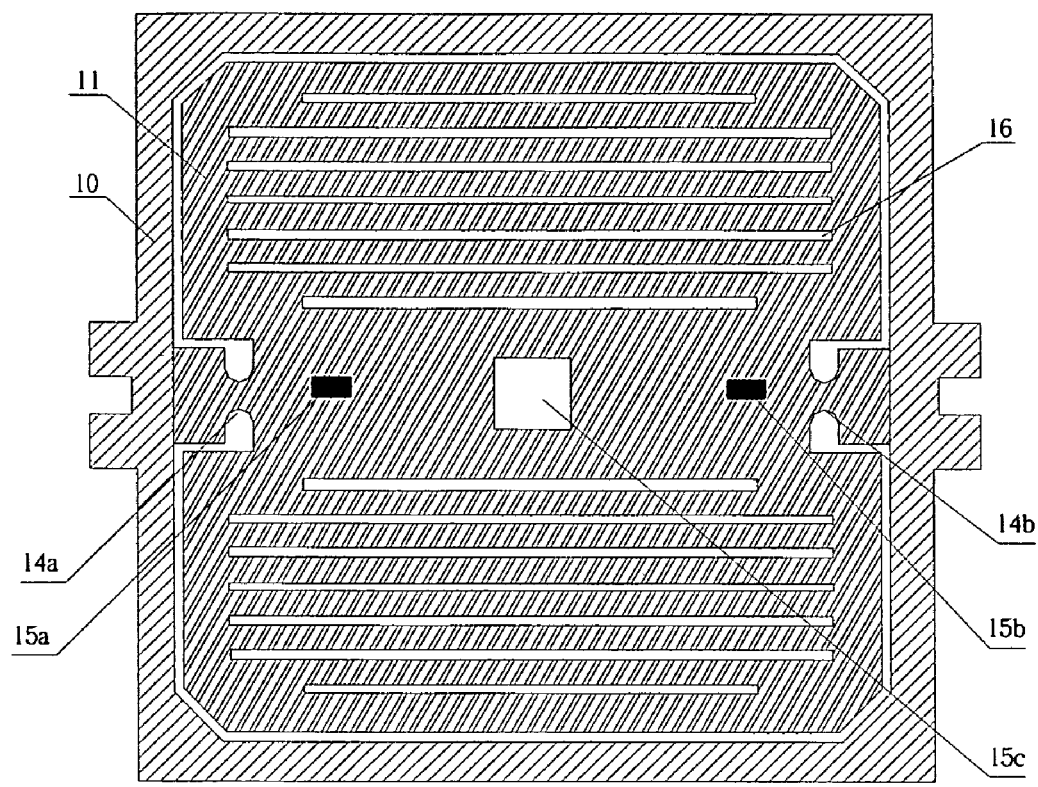
FIG. 14 is a perspective view of the sensing element (silicon slice) of the novel silicon micromechanical gyroscope according to above preferred embodiment of the present invention.

Referring to FIG. 9, FIG. 10 and FIG. 14 of the drawings, the sensing element 1 further comprises a silicon slice frame 10, a silicon slice 11, an upper electrode ceramics plate 12 and a bottom electrode ceramics plate 13, a pair of vibrate beams 14a, 14b, a first pair of electrode layers 21a, 21b and a second pair of electrode layers 22a, 22b. In the present embodiment, the silicon slice frame 10 is a rectangular flat frame. The silicon slice 11 is a rectangular flat vibrate mass. The silicon slice 11 has the area less than that of the silicon slice frame 10, and has the thickness less than that of the silicon slice frame 10. A square through hole 15c is formed in the center of the silicon slice 11. 3~6 elongated through hole 16 is formed in each of both sides of the square through hole 15c. The silicon slice 11 is connected with the silicon slice frame 10 through the pair of vibrate beams 14a, 14b respectively. The pair of vibrate beams 14a, 14b is provided perpendicular to the silicon slice 11. The second pair of electrode layers 22a, 22b is spacedly provided in the bottom electrode ceramics plate 13. The first pair of electrode layers 21a, 21b, the second pair of electrode layers 22a, 22b and the silicon slice 11 are disposed in such manner that a series of electric condensers C1, C2, C3, C4 are formed.

The signal process circuit 2 comprises a signal detecting bridge circuit and a SCM, which comprises a data process module. The electric condensers C1, C2, C3, C4 is used as bridge arms of the signal detecting bridge circuit. The output signal of detecting bridge circuit, amplified by an amplifier, is sent to the SCM to data process. If there is not a rotating movement of the rotating body, the bridge circuit is balance, and no output signal is achieved. If there is a rotating movement of the rotating body, the silicon slice's position will change, and the capacity of the electric condensers C1, C2, C3, C4 will change correspondingly. Finally, a signal, which is in a direct ratio with the rotating body's pitch and roll angular velocity, is achieved.

Figure 12:
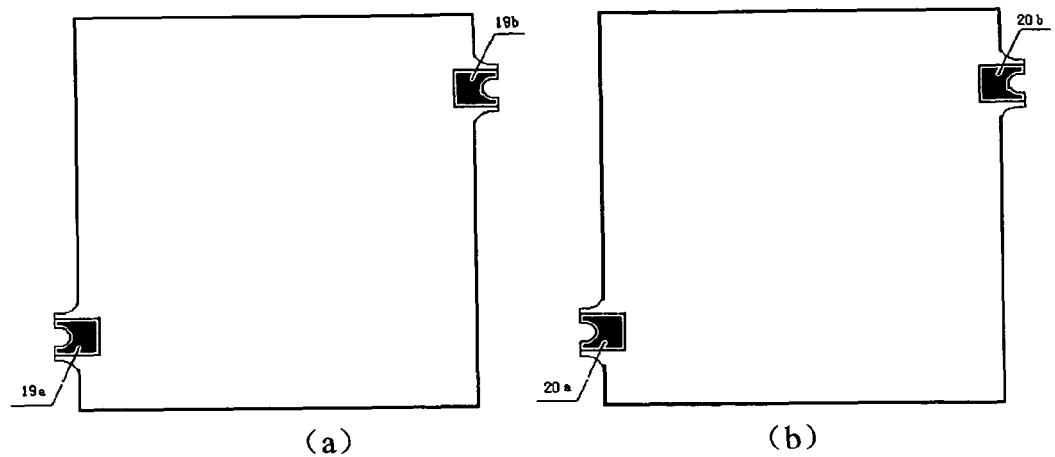
FIG. 12 is a perspective view of an electrode ceramics board of the novel silicon micromechanical gyroscope according to above preferred embodiment of the present invention, wherein figure (a) points out an upper electrode ceramics plate and figure (b) points out a bottom electrode ceramics plate.

The sensing element is made in a micromechanical process. The silicon slice frame 10, the silicon slice 11 and the upper and bottom electrode ceramics plate 12, 13 is provided in a sandwich structure, referring to FIG. 9, 10, 11, 14 of the drawings. FIG. 9 shows a top view of this sandwich structure. In this FIG. 9, the black areas are welding spots of the electric wires of the silicon slice frame 10, the silicon slice 11 and the upper and bottom electrode ceramics plate 12, 13, which is used for welding these electric wires to the insulator 6. The upper and bottom electrode ceramics plate 12, 13 are made of ceramics board having a thickness of 0.5 mm and a square area of 16×18 mm$^2$, as shown in FIG. 14 of the drawings. For avoiding contact with the silicon slice 11, two pairs of welding channels 19a, 19b and 20a, 20b (black area in FIG. 12), having a depth of 0.050 mm, are respectively formed in the upper and bottom electrode ceramics plate 12, 13, as shown in FIG. 12. For achieving conduct ability, the upper and bottom electrode ceramics plate 12, 13 further comprises a metal Ti layer and a metal copper layer are sequentially coated thereon respectively. Therefore, the two independent electrodes 21a, 21b are formed in the upper electrode ceramics plate 12 and the two independent electrodes 22a, 22b are formed in the bottom electrode ceramics plate 13, as shown in FIG. 10. The silicon slice frame 10, the silicon slice 11 and the pair of vibrate beams 14a, 14b are made of corroded N-type silicon. Therefore, the silicon slice frame 10, the silicon slice 11 and the upper and bottom electrode ceramics plate 12, 13 of sandwich structure together to form the sensing element 1. It is worth to mention that, the weld spots are respectively formed in a frontal surface of the upper electrode ceramics plate 12 and a back surface of the bottom electrode ceramics plate 13. For ensuring properly weld progress, a thin copper wire is provided to electrically connect the electrode of the upper electrode ceramics plate 12 to the electrode of the bottom electrode ceramics plate 13. In the sandwich structure of the sensing element 1, these electrode plates and the silicon slice 11 are unitized to a whole by coating with glue and then baking in a baking oven.

Figure 13:
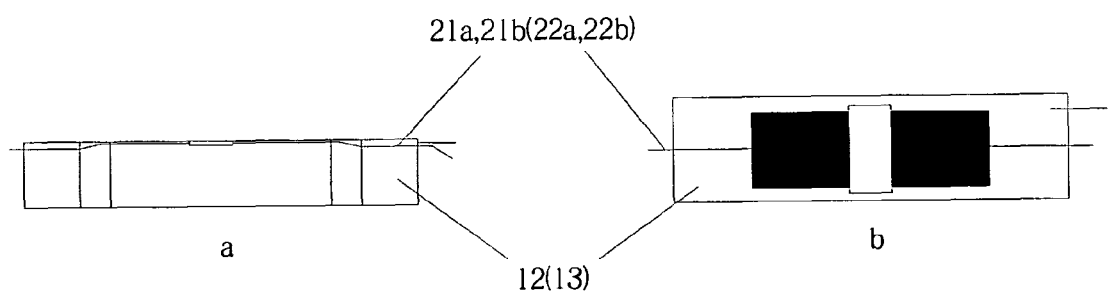
FIG. 13 is another perspective view of the electrode ceramics board of the novel silicon micromechanical gyroscope according to above preferred embodiment of the present invention, wherein figure (a) points out a front view of the electrode ceramics board and figure (b) points out a top view of the electrode ceramics board.

The electrode ceramics plates are main key element of the present invention, and the processing technology of the electrode ceramics plates is shown in FIG. 13.

1) grinding two ceramics member into a channel respectively, shown in FIG. 13(a); and 2) coating the channel with a copper layer or an aluminum layer of a thickness of 2~3 μm.

Figure 5:
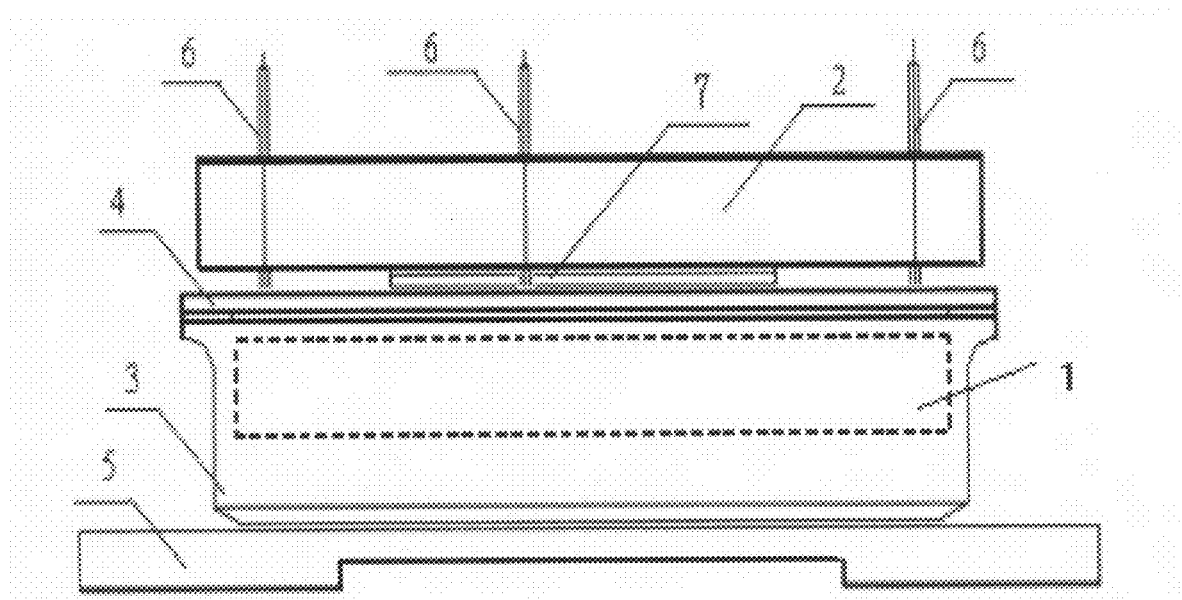
FIG. 5 is a front view of the novel silicon micromechanical gyroscope according to above preferred embodiment of the present invention.
Figure 6:
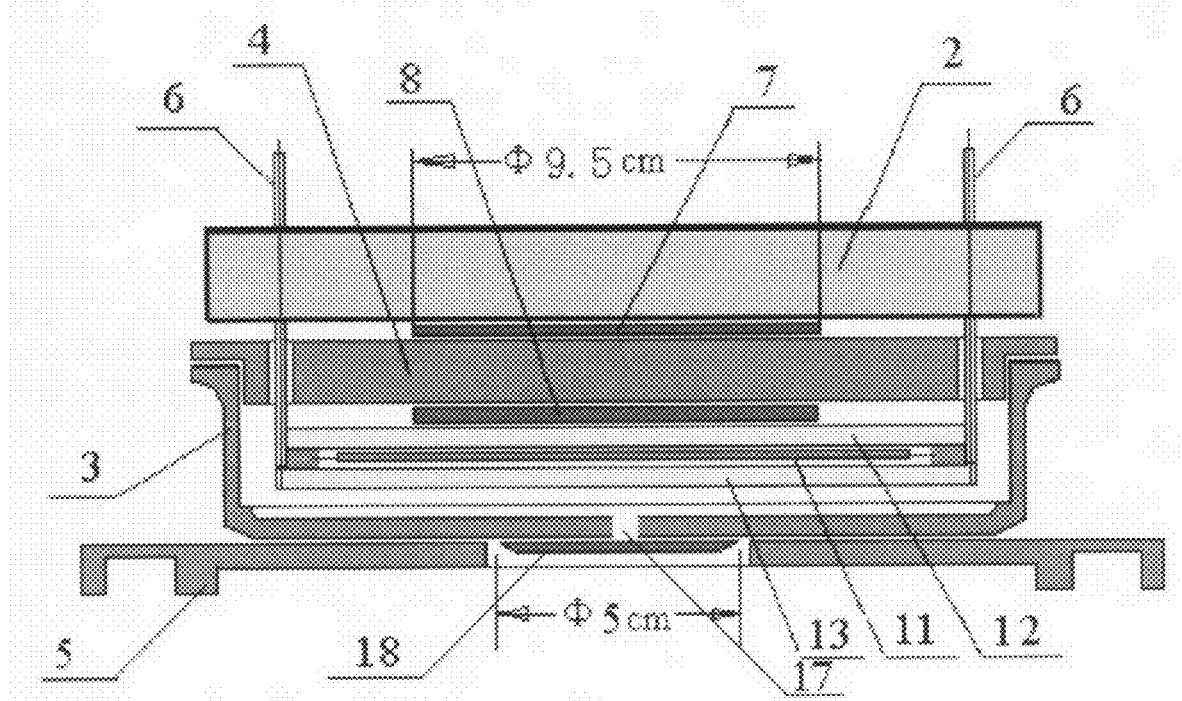
FIG. 6 is a cross section view of the novel silicon micromechanical gyroscope according to above preferred embodiment of the present invention.
Figure 7:
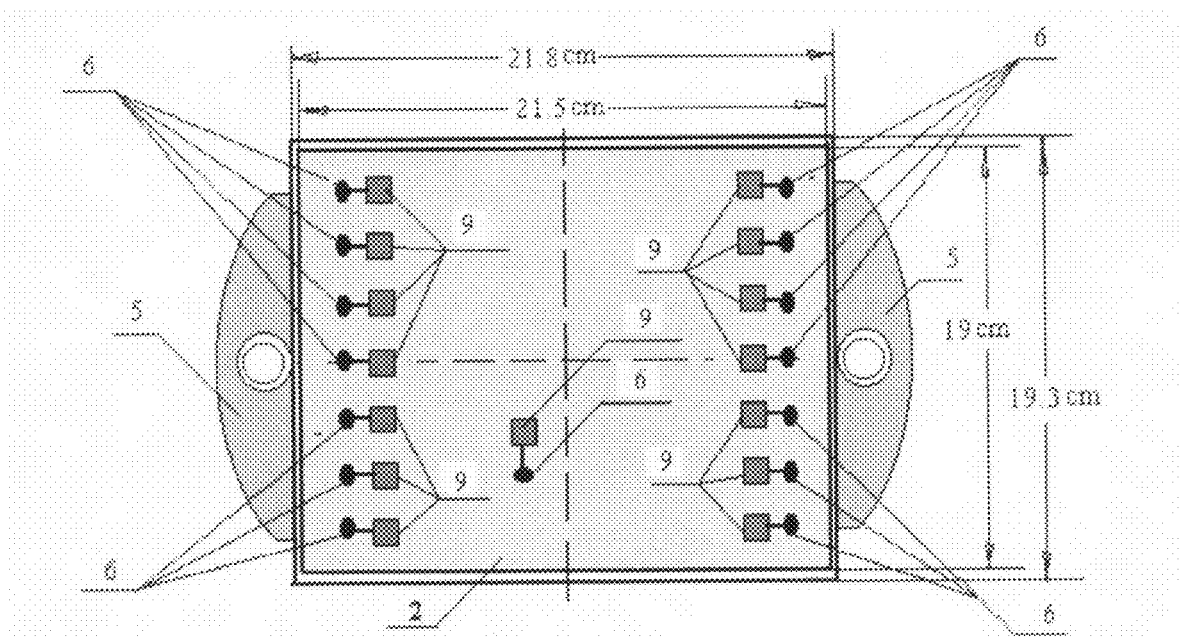
FIG. 7 is a top view of the novel silicon micromechanical gyroscope according to above preferred embodiment of the present invention.
Figure 8:
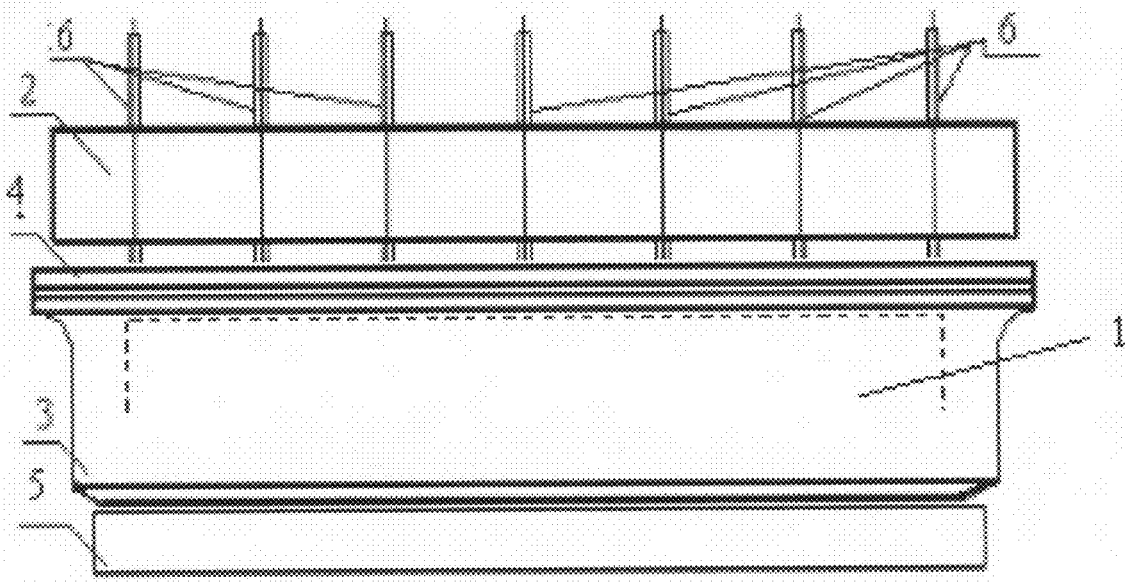
FIG. 8 is a side view of the novel silicon micromechanical gyroscope according to above preferred embodiment of the present invention.
Figure 17:
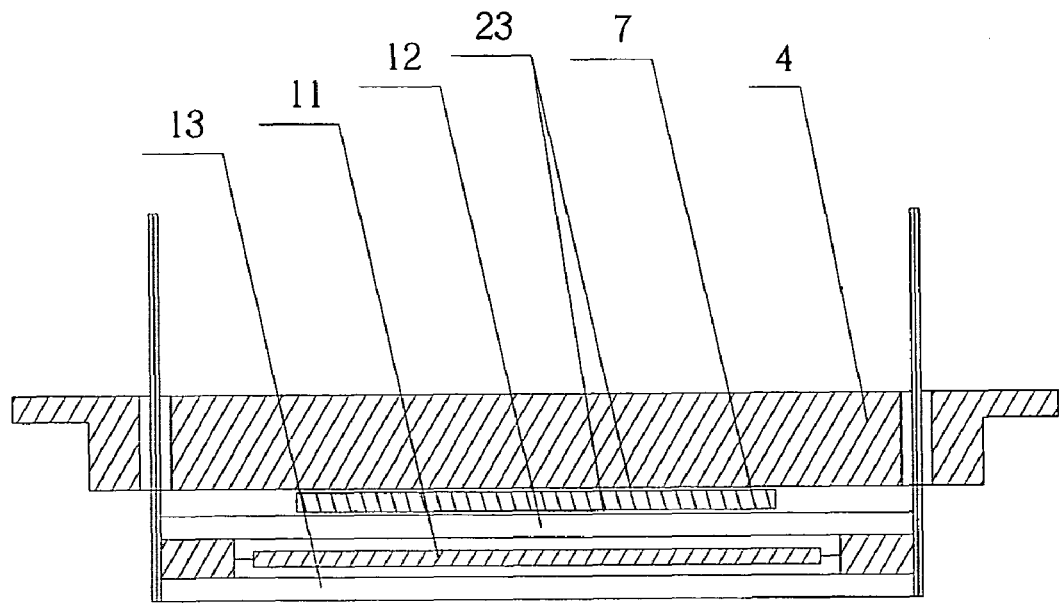
FIG. 17 is a perspective view of a base board of the novel silicon micromechanical gyroscope according to above preferred embodiment of the present invention, illustrating the sensing element is adhered to the base board.
Figure 18:
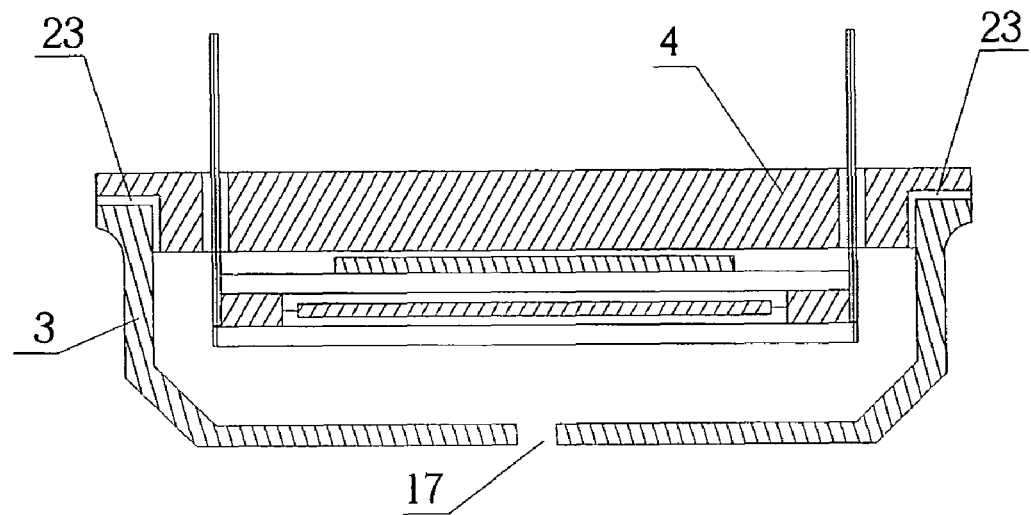
FIG. 18 is a perspective view of a housing of the novel silicon micromechanical gyroscope according to above preferred embodiment of the present invention, illustrating the base board is adhered to the housing.

Referring to FIG. 17 of the drawings, the sensing element 1 is adhered to the base board 4 through a gumming layer. The gumming layer has a thickness of 2 μm. An aluminum oxide ceramics circular gasket for achieving an insulating function, having a thickness of 0.35 mm and a diameter of 9.5 mm, is disposed between the sensing element 1 and the base board 4. Similarly, sensing element 1 and the base board 4 are unitized to a whole by coating with the gumming layer and then baking in a baking oven. The leading wire of the sensing element is wired on the insulator 6 provided on the base board 4, as shown in FIG. 5 and FIG. 6 of the drawings. Similarly, the base board with these elements thereon is adhered to the housing 3.

Figure 19:
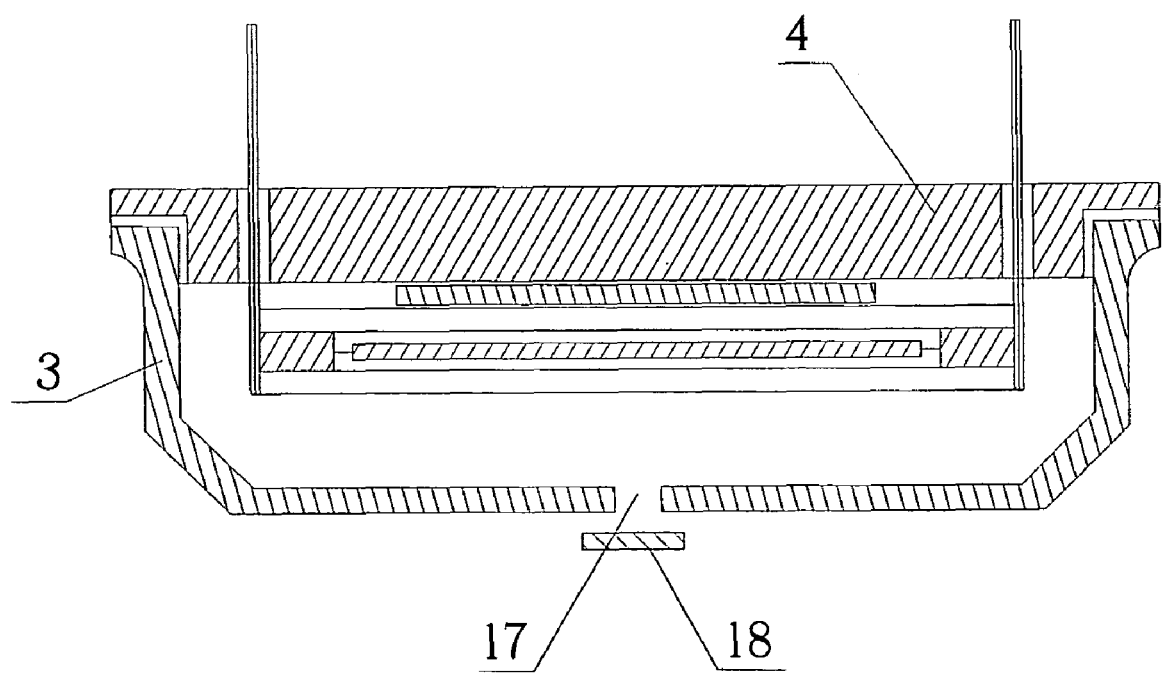
FIG. 19 is a perspective view of the housing of the novel silicon micromechanical gyroscope according to above preferred embodiment of the present invention.

FIG. 19 shows a section cross view of the housing 3 of the present invention. The housing 3 comprises a sealed aperture 17, with a diameter of 0.5 mm, formed in the center thereof, peripherally coated with a thin tin layer, and a sealed disk 18, with a diameter of 4 mm and a thickness of 0.2 mm, covered on the sealed aperture. It is worth to mention that the gumming process has done in a vacuum condition, which has the pressure intensity in 0.1~0.2 mmHg. Firstly, heating the temperature to 105° C. and keeping in for 3-3.5 hours, and then lowering the temperature and inletting the Nitrogen for 30 mins. In above circumstance, we can dissolve the tin layer by a soldering iron, and then weld the sealed disk 18 to the housing 3.

Seen from a high-power microscope, the gumming layer is evenly laid between the silicon slice 11 and the upper and bottom electrode ceramics plate 12, 13. The sensing element 1 is baking in the baking oven under the temperature of 80° C. A filling piece, coated with gumming layer both sides with a smoothness of 0.08 μm and a parallelization of 0.02 mm, is used for adhering the bottom electrode ceramics plate 13 to the center of the housing 3. Then, the sensing element 1 is baking in the baking oven under the temperature of 60° C. to be a silicon slice 11. The processing of silicon slice 11 has done in a vacuum condition, which has the pressure intensity in 0.02 mmHg. Firstly, keeping the pressure intensity in 0.02 mmHg for 3 hours, and then taking silicon slice 11 into a control room of the pressure intensity in 0.02 mmHg and inletting the Nitrogen in 700 mmHg 10 mins later. When the dew point of the Nitrogen is lower than −50°, a semi-cover is provided to weld on the sealed aperture 17. Additional, a helium mass spectrometer leak detector is used for checking whether the silicon element is in a sealed condition. The static capacity value between the silicon slice 11 and the electrode ceramics plates is shown in the following chart 1.

CHART 1

| static capacity value of the sealed silicon slice (Unit:pF) | | | | |
|---|---|---|---|---|
| | Measuring point | | | |
| | $C_{2-4}$ | $C_{6-4}$ | $C_{9-4}$ | $C_{11-4}$ |
| Capacity value of Sensing element (silicon slice) (pF) | 29.7 | 33.9 | 26.1 | 31.1 |

Figure 16:
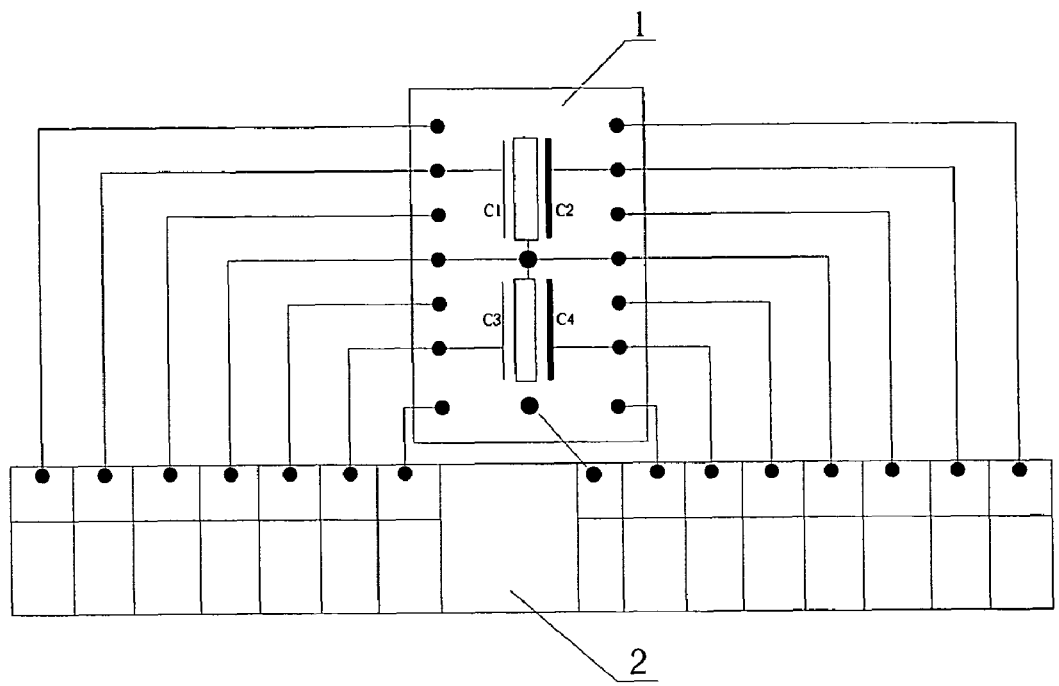
FIG. 16 is a circuit connection graph of the novel silicon micromechanical gyroscope according to above preferred embodiment of the present invention.

According to the circuit diagram as shown in FIG. 16 of the drawings, the electrical elements are welded on the processed circuit board one-by-one. The scaling powder is rosin essence and alcohol. By using the scaling powder, a corrosion behavior of the welding work is effectively avoided. The welding work is done in an electrostatic prevention arc-welding machine under a strictly controlled temperature and time condition. What's more, a series of detecting and debugging work is done to the welded circuit board.

Figure 11:
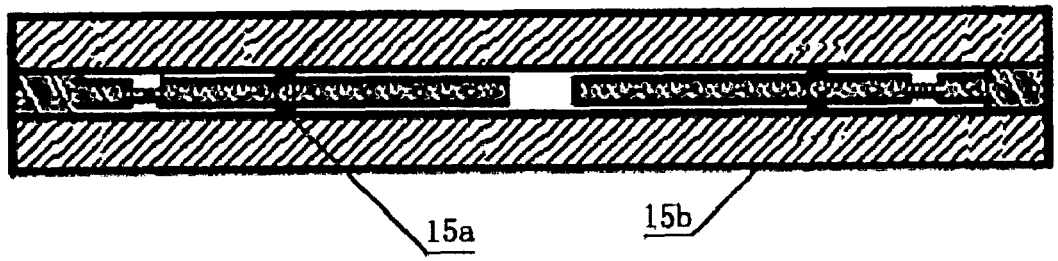
FIG. 11 is another cross section view of the sensing element of the novel silicon micromechanical gyroscope according to above preferred embodiment of the present invention.
Figure 15:
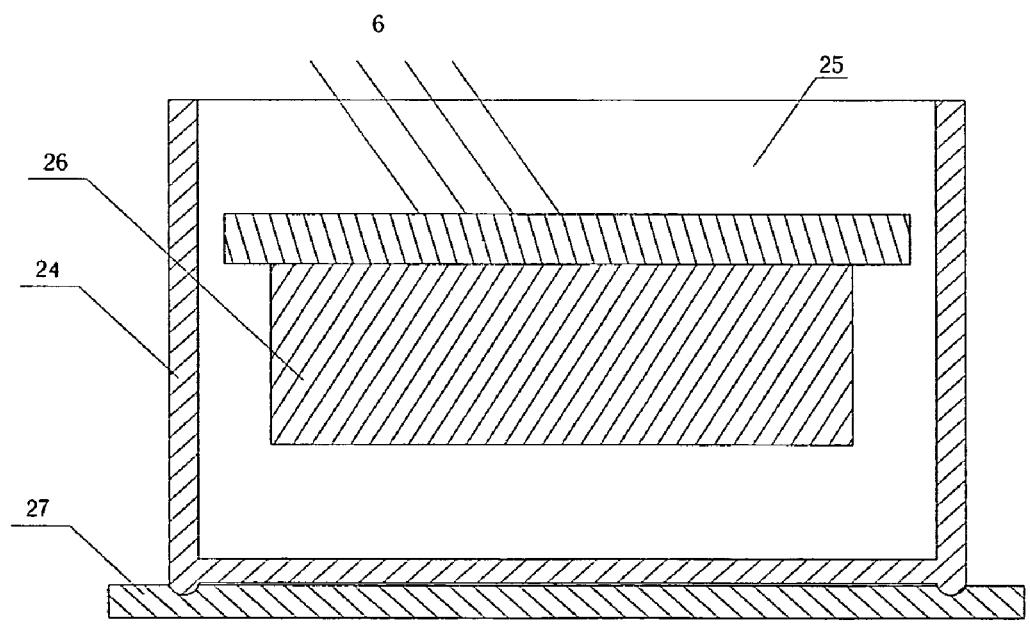
FIG. 15 is a cross section view of the sensing element (silicon slice) of the novel silicon micromechanical gyroscope according to above preferred embodiment of the present invention, illustrating an anti-attacked structure of the sensing element.

The present invention further comprises an anti-attacked structure of the sensing element, referring to FIG. 11, FIG. 14 and FIG. 15 of the drawings. A pair of anti-attacked pads 15a and 15b is respectively provided at both sides of the sensing element 11. A gyroscopic member 26 is sealed into a shell 24 made of aluminum material by ethoxyline resin 25. An anti-attacked pad 27 made of rubber is laid on the bottom surface.

Referring to FIG. 5 and FIG. 6 of the drawings, the housing 3 of the present invention is adhered on the mounting frame 5 by glue so as to mount the gyroscopic on the rotating body.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A silicon micromechanical gyroscope, comprising
a sensing element, comprising:
a swinging silicon slice,
an elastic twist beam hanging the swinging silicon slice within a packaging chamber, wherein said elastic twist beam allows the swinging silicon slice to swing around the lengthwise axis of the beam within a range of angle in the chamber, and
a capacitance sensing element comprising four capacitors formed between the swinging silicon slice and the chamber, wherein the output signal of the capacitors is responsive to the position of the swinging silicon slice; and
a signal processing circuit for analyzing the output signal of the capacitor, comprising:
a signal detecting bridge circuit formed by the capacitance sensing element as bridge arm; and
a SCM signal process circuit with data process module, wherein the capacitance sensing element adopts no driving structure, when the gyroscope is mounted on a rotating body, the output signal of the capacitors can be analyzed to detect a rotation angular velocity and transverse angular velocity of the rotating body simultaneously through the signal processing circuit.

2. The silicon micromechanical gyroscope as claimed in claim 1, wherein the capacitors are differential capacitors.

3. The silicon micromechanical gyroscope as claimed in claim 1, further comprising an anti-shock pad positioned on upper and bottom surface of the swinging silicon slice.

4. The silicon micromechanical gyroscope as claimed in claim 1, wherein a through hole is formed in the center of the swinging silicon slice.

5. The silicon micromechanical gyroscope as claimed in claim 1, wherein a plurality of elongated through holes are formed in each of both sides of said swinging silicon slice, serving as damping bars.

6. The silicon micromechanical gyroscope as claimed in claim 1, wherein the swinging silicon slice and the elastic twist beam are formed by etching on one silicon slice.

7. The silicon micromechanical gyroscope as claimed in claim 1, further comprising a silicon frame, wherein the swinging silicon slice is positioned within the silicon frame by the elastic twist beam and is smaller in thickness than the silicon frame.

* * * * *